(12) United States Patent  (10) Patent No.: US 8,705,253 B2
Roman                          (45) Date of Patent:     Apr. 22, 2014

(54) ISOLATED SEPIC POWER CONVERTER FOR LIGHT EMITTING DIODES AND OTHER APPLICATIONS

(75) Inventor: Jon R. Roman, Umatilla, FL (US)

(73) Assignee: National Semiconductor Corporation, Santa Clara, CA (US)

( * ) Notice: Subject to any disclaimer, the term of this patent is extended or adjusted under 35 U.S.C. 154(b) by 242 days.

(21) Appl. No.: 13/156,086

(22) Filed: Jun. 8, 2011

(65) Prior Publication Data

US 2012/0314455 A1    Dec. 13, 2012

(51) Int. Cl.
*H02M 3/335*    (2006.01)

(52) U.S. Cl.
USPC ...................................... 363/21.1; 363/21.02

(58) Field of Classification Search
USPC ................. 363/20, 21.01–21.04, 21.1, 21.12, 363/21.18
See application file for complete search history.

(56) References Cited

U.S. PATENT DOCUMENTS

2010/0265231 A1* 10/2010 Jang ............................. 345/211

OTHER PUBLICATIONS

Robert W. Erickson, et al., "DC-DC Power Converters", Article in Wiley Encyclopedia of Electrical and Electronics Engineering, 19 pages.

Wei Gu, et al., "Designing a SEPIC Converter", National Semiconductor Corporation, Apr. 30, 2008, 8 pages.
Rudy Severns, "The History of the Forward Converter", Switching Power Magazine, Jul. 2000, p. 20-22.
"Design Guidelines for Off-line Flyback Converters Using Fairchild Power Switch (FPS)", Fairchild Semiconductor, Jan. 13, 2004, 20 pages.
"Fly-Back Type Switched Mode Power Supply", Module 3 DC to DC Converters, Version 2 EE IIT, Kharagpur, 15 pages.
"Forward Type Switched Mode Power Supply", Module 3 DC to DC Converters, Version 2 EE IIT, Kharagpur, 14 pages.

* cited by examiner

*Primary Examiner* — Harry Behm
*Assistant Examiner* — Matthew Grubb
(74) *Attorney, Agent, or Firm* — Andrew Viger; Wade J. Brady, III; Frederick J. Telecky, Jr.

(57) ABSTRACT

A system includes a load and a single-ended primary-inductance converter (SEPIC) power converter configured to provide power to the load. The SEPIC power converter includes a primary side and a secondary side that are electrically isolated by a transformer. The transformer includes a primary coil and a secondary coil. The primary side includes (i) a capacitor coupled to a first end of the primary coil and (ii) an inductor and a switch coupled to a second end of the primary coil. The primary side of the SEPIC power converter could also include a diode coupled between the inductor and the switch, where the diode is coupled to the second end of the primary coil. The capacitor could be configured to transfer energy to the secondary side of the SEPIC power converter through the transformer during valleys associated with a rectified input voltage.

12 Claims, 5 Drawing Sheets

ISOLATED SEPIC POWER CONVERTER FOR LIGHT EMITTING DIODES AND OTHER APPLICATIONS

TECHNICAL FIELD

This disclosure relates generally to power converters. More specifically, this disclosure relates to an isolated single-ended primary-inductance converter (SEPIC) power converter for light emitting diodes (LEDs) and other applications.

BACKGROUND

Solid State Lighting (SSL) refers to lighting solutions that use light emitting diodes (LEDs) to generate illumination. LEDs are much more efficient in generating illumination compared to traditional incandescent lighting solutions. For this and other reasons, there is much interest in replacing conventional incandescent light bulbs with LED light bulbs.

Existing SSL lighting solutions often use isolated flyback power converters to convert input voltages into output voltages suitable for use by LED light bulbs. However, an isolated flyback power converter often requires the use of a large transformer, as well as the use of a large electromagnetic interference (EMI) filter. This typically increases the size and cost of the LED light bulbs. The use of these large components also conflicts with the need to limit the size of the power converters, since the LED light bulbs typically need to fit within standard Edison-style light sockets and need large amounts of space for thermal management.

BRIEF DESCRIPTION OF DRAWINGS

For a more complete understanding of this disclosure and its features, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
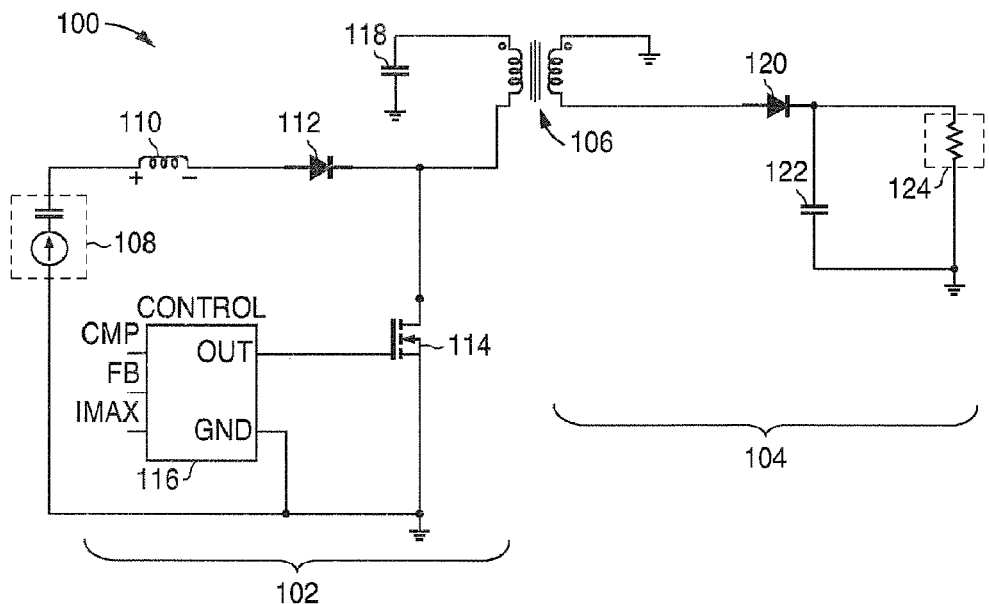
FIGS. 1 and 2 illustrate a first example isolated single-ended primary-inductance converter (SEPIC) power converter and related details according to this disclosure.
Figure 2:
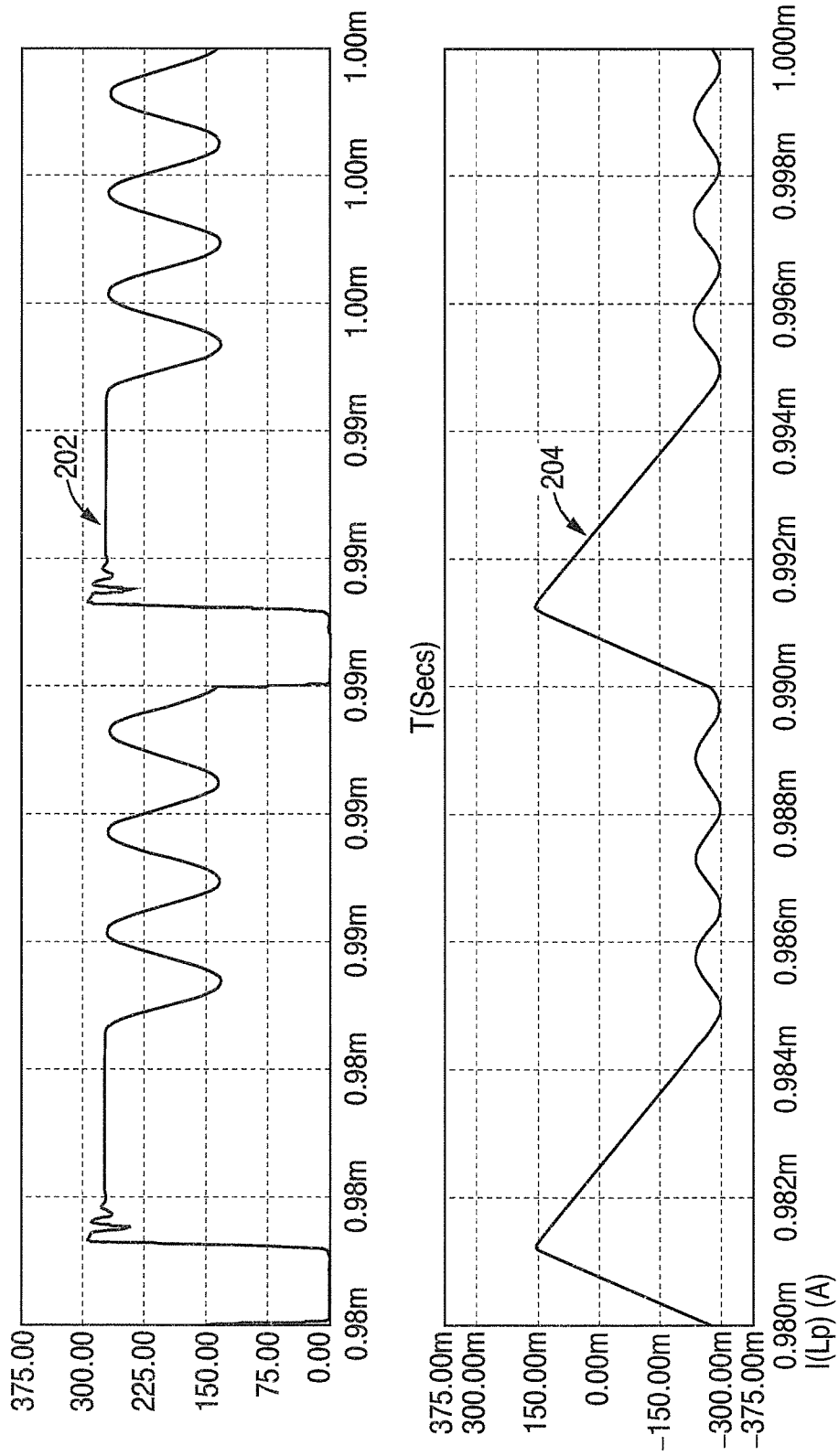

FIGS. 1 and 2 illustrate a first example isolated single-ended primary-inductance converter (SEPIC) power converter 100 and related details according to this disclosure. As shown in FIG. 1, the SEPIC power converter 100 includes a primary side 102 and a secondary side 104. The primary side 102 generally receives energy from a power source 108 and provides the energy to the secondary side 104, which delivers the energy to a load. The primary side 102 is electrically isolated from the secondary side 104 by a transformer 106. The transformer 106 includes conductive coils that are inductively coupled so that current flow through one coil results in current flow through the other coil.

The transformer 106 includes any suitable structure electrically isolating circuits using inductive coupling. The power supply 108 in this example includes a current source and a capacitor. However, the power supply 108 can include any suitable structure providing energy to the power converter 100, such as a direct current (DC) power source like a battery or super-capacitor or an alternating current (AC) power source. If used with an AC power source, the power supply 108 could include rectification circuitry or other components for generating DC energy from an AC signal.

One end of an inductor 110 is coupled to the power supply 108. The use of a discrete inductor 110 can help to reduce the size of the transformer 106, as well as reduce the amount of electromagnetic interference (EMI) conducted from the primary side 102 to the secondary side 104. The inductor 110 includes any suitable inductive structure having any suitable inductance. An optional diode 112 is coupled in series with the inductor 110. The diode 112 includes any suitable structure substantially limiting current flow to one direction.

A switch 114 is connected to the diode 112 or, if the diode 112 is omitted, to another end of the inductor 110. The switch 114 is operated to control the operation of the power converter 100. For example, closing (turning on) and opening (turning off) the switch 114 can generate a varying current through the primary side of the transformer 106, creating a current in the secondary side of the transformer 106. The switch 114 includes any suitable structure operated to selectively create or break an electrical connection, such as an n-channel enhanced MOSFET or other transistor.

A control unit 116 controls the operation of the switch 114. For example, the control unit 116 could generate a pulse width modulated (PWM) control signal for a gate of a transistor forming the switch 114. The control unit 116 in this example includes inputs for receiving compensation (COMP), feedback (FB), and maximum current (IMAX) signals. The control unit 116 also includes an output for providing a drive signal (OUT) and is coupled to ground (GND). However, any other suitable control unit with other or additional inputs or outputs could be used. The control unit 116 includes any suitable structure for controlling a switch, such as a fixed or variable on-time or off-time controller.

As shown in FIG. 1, the components 110-116 form a sub-circuit coupled to one end of the primary coil in the transformer 106. The other end of the primary coil in the transformer 106 is coupled to a capacitor 118. The capacitor 118 includes any suitable capacitive structure having any suitable capacitance.

In this example, one end of the secondary coil in the transformer 106 is coupled to ground, and the other end of the secondary coil in the transformer 106 is coupled to a diode 120. The diode 120 includes any suitable structure for substantially limiting current flow to one direction. The diode 120 is coupled to an output capacitor 122, which includes any suitable capacitive structure having any suitable capacitance. A load 124 is represented in FIG. 1 by a resistor. The load 124 represents any suitable component(s) that receive energy from the power converter 100, such as one or more light emitting diodes (LEDs).

In one aspect of operation, the inductor 110 stores and releases energy received from the power supply 108. When the switch 114 is closed (turned on), the energy stored in the inductor 110 substantially flows through the switch 114. When the switch 114 is opened (turned off), the energy stored in the inductor 110 substantially flows through the primary side of the transformer 106 and is stored by the capacitor 118. These operations create a varying current in the primary side of the transformer 106, which creates a current in the secondary side of the transformer 106 and provides energy to the load 124.

FIG. 2 illustrates example waveforms associated with simulated operation of the power converter 100 in FIG. 1. In particular, a waveform 202 denotes the voltage on the drain of the switch 114, which in this example also represents the voltage at the lower end of the primary coil in the transformer 106. A waveform 204 denotes a current through the primary coil of the transformer 106.

As can be seen in FIG. 2, the voltage on the drain of the switch 114 drops substantially to zero during the off times of the switch 114. During these switch off times, the current through the primary coil of the transformer 106 increases. When the switch 114 is turned on, the voltage on the drain of the switch 114 increases and remains steady for a period before oscillating prior to the next off time. This causes the current through the primary coil of the transformer 106 to drop and then oscillate. These changes in current through the primary coil of the transformer 106 transfer energy to the secondary coil of the transformer 106, thus providing energy to the load 124.

As noted above, the use of the diode 112 is optional. Without the diode 112, the voltage on the capacitor 118 generally follows the voltage on the input bus. In this case, energy is stored in the capacitor 118 during "peaks" of a 120 Hz or other rectified AC input voltage, but power is not transferred to the secondary side 104 during "valleys" of the rectified input voltage. Rather, reverse current can flow backwards into the input bus during the "valleys," taking power away from the converter 100. With the diode 112, the current through the inductor 110 can drop to zero during each switching cycle, and the capacitor 118 can be used to supply energy to the secondary side 104 during the "valleys" in the rectified AC input voltage (the capacitor 118 may be larger when the diode 112 is used in order to store more energy). In this way, the power converter 100 draws power from the capacitor 118, supplying power to the load 124 during the "valleys." The use of the diode 112 could allow the power converter 100 to achieve higher power factors, such as power factors of about 0.9 or more. This may, however, require the use of a normally-sized transformer 106, rather than a reduced size. This can therefore lead to a trade-off in the design of the power converter 100 between the size of the transformer 106 and the size of the capacitor 118.

During operation, the power converter 100 uses the transformer 106 in multiple roles. In particular, the power converter 100 uses the transformer 106 to effectively behave as a flyback converter when the switch 114 is closed. The power converter 100 also uses the transformer 106 to effectively behave as a forward converter when the switch 114 is opened.

Depending on the implementation, this topology for an isolated SEPIC power converter can provide various advantages over conventional isolated flyback power converters. The SEPIC power converter 100 of FIG. 1 could be used in both low power and high power applications. When used in high power applications, the SEPIC power converter 100 could be similar in size and have a similar number of components as conventional isolated flyback power converters. However, the SEPIC power converter 100 could deliver up to twice the amount of power or even more to the load 124 with a similarly sized transformer. This could allow the SEPIC power converter 100 to be used with LED light bulbs, such as LED light bulbs with a light output equivalent to between about 40 W and about 200 W. When used in low power applications, smaller and lower cost transformers, EMI filters, clamp circuits, external capacitors, or other components could be used. The smaller clamp circuit can be achieved due to the reduction in primary current and the corresponding reduction in losses attributable to leakage inductance. The reduction in the primary current also enables the reduction in size and complexity of the EMI circuitry.

Because of this, the SEPIC power converter 100 has a wide range of uses in LED lighting products and other products that may require or benefit from the use of an efficient isolated SEPIC power converter having a high power factor and a small size. While often described as being used with LEDs as the load 124, the SEPIC power converter 100 could be used with any other suitable load. For instance, the SEPIC power converter 100 could be used in an AC-to-DC power converter that plugs into an AC electrical outlet (often called a "wall wart").

Figure 3:
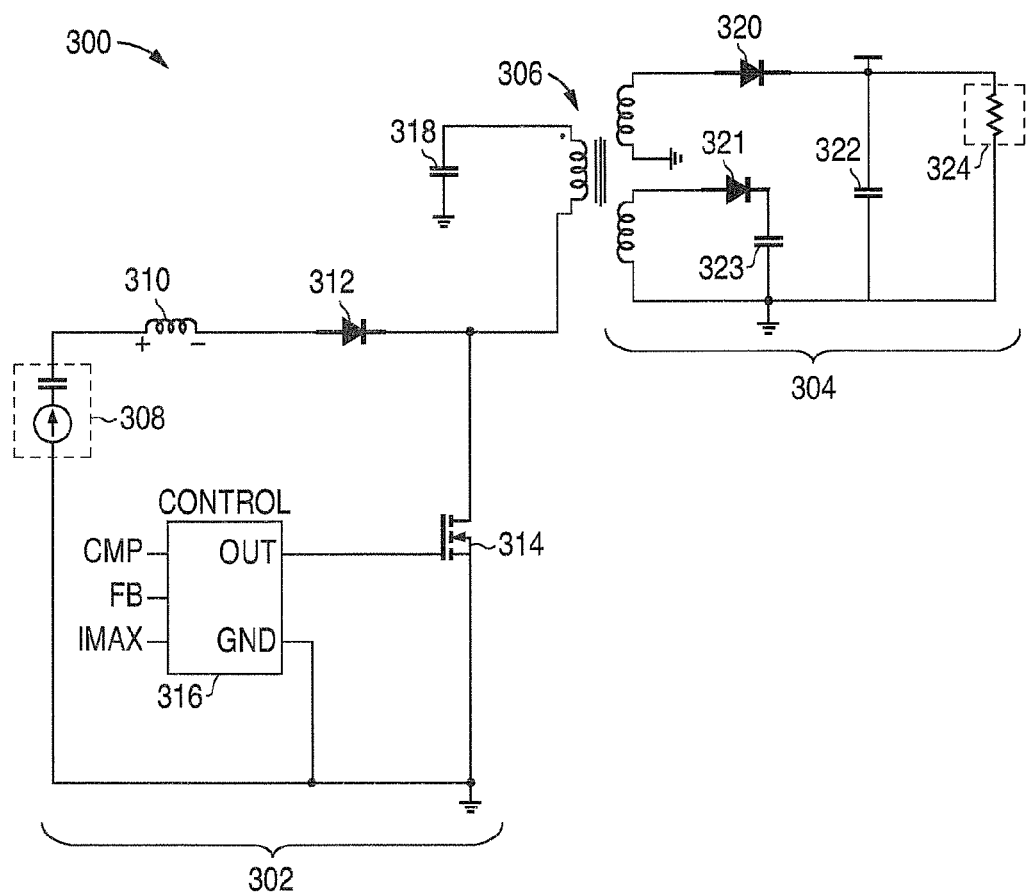
FIGS. 3 and 4 illustrate a second example isolated SEPIC power converter and related details according to this disclosure.
Figure 4:
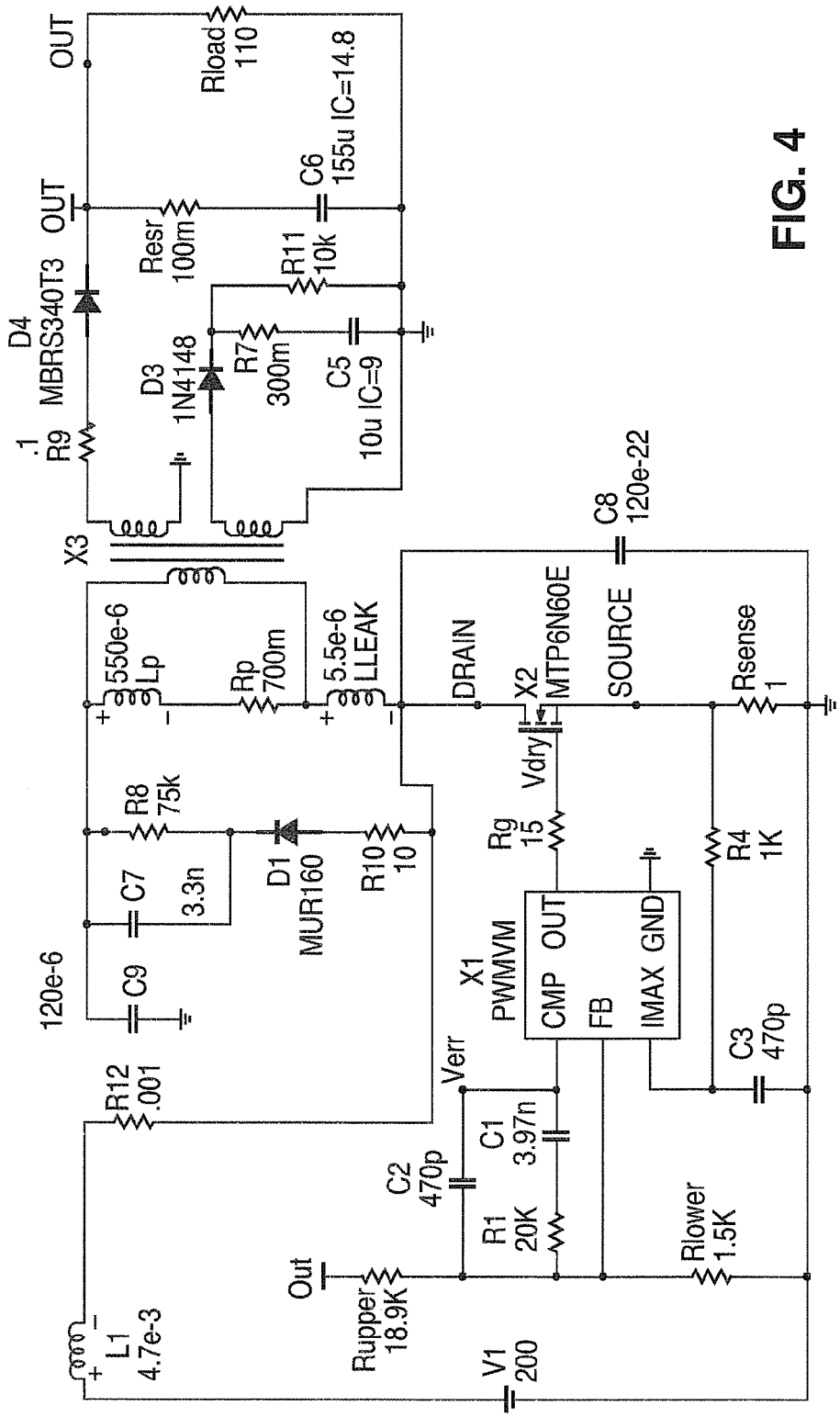

FIGS. 3 and 4 illustrate a second example isolated SEPIC power converter 300 and related details according to this disclosure. As shown in FIG. 3, the power converter 300 includes a primary side 302 and a secondary side 304 that are electrically isolated by a transformer 306. The primary side 302 is coupled to a power source 308. The primary side 302 operates in the same manner as the primary side 102 in FIG. 1 and includes components 310-318 arranged in the same or similar manner as in FIG. 1.

One secondary coil of the transformer 306 is coupled to a diode 320, which is coupled to an output capacitor 322 and a load 324. This secondary coil and the components 320, 322, 324 are therefore arranged in the same or similar manner as the secondary side 104 in FIG. 1. Unlike FIG. 1, an additional secondary coil of the transformer 306 is coupled to a diode 321, which is coupled to a capacitor 323. The additional secondary coil of the transformer 306 and the components 321, 323 are arranged to generate an auxiliary voltage, which can be used in any suitable manner.

FIG. 4 illustrates a specific implementation of the SEPIC power converter 300. In FIG. 4, additional components are added to the simplified version shown in FIG. 3, and component values are provided for all of the components in FIG. 4. Note that this represents one specific implementation of the SEPIC power converter 300. Other implementations having other additional components and/or other component values could also be used.

Although FIGS. 1 through 4 illustrate examples of isolated SEPIC power converters, various changes may be made to FIGS. 1 through 4. For example, the isolated SEPIC power converters 100 and 300 have been simplified for ease of illustration and explanation. As shown in FIG. 4, an isolated SEPIC power converter could implement the features described above using more complex circuitries. Also, the waveforms shown in FIG. 2 are for illustration only, and other embodiments of an isolated SEPIC power converter could have any suitable waveforms. In addition, the component values shown in FIG. 4 are examples only.

Figure 5:
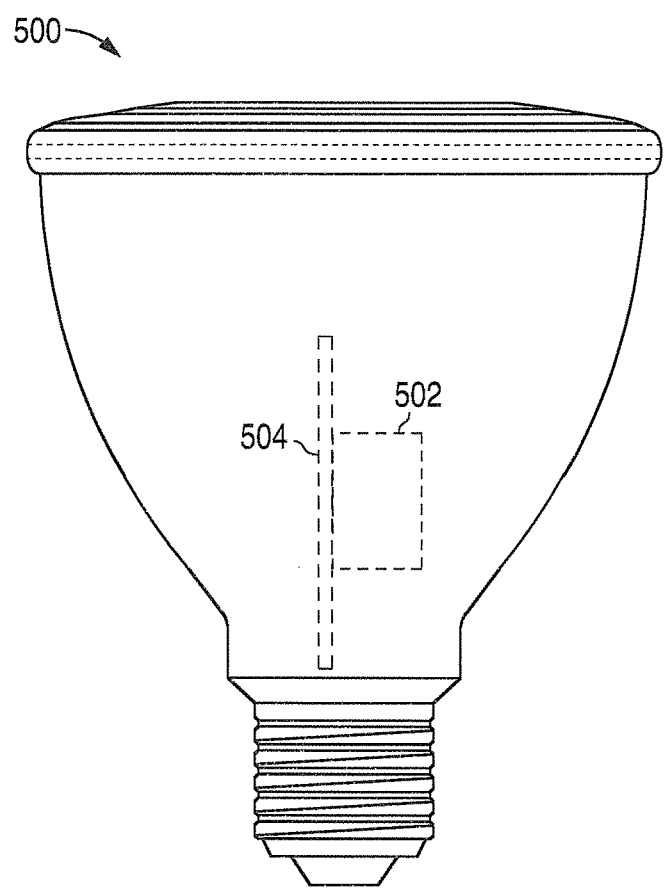
FIG. 5 illustrates an example use of an isolated SEPIC power converter according to this disclosure.

FIG. 5 illustrates an example use of an isolated SEPIC power converter according to this disclosure. In particular, FIG. 5 illustrates an example LED light bulb 500, which includes an isolated SEPIC power converter 502 and a printed circuit board 504. The isolated SEPIC power converter 502 could represent any of the isolated SEPIC power converters described above or other isolated SEPIC power converters that operate according to the principles described above. The printed circuit board 504 can be used to electrically couple the power converter 502 to other components, such as LEDs in the bulb 500 and/or a power supply (such as the power supply 108 or 308).

Note that the positions of the power converter 502 and the printed circuit board 504 are for illustration only. These components could be located in any suitable positions within the bulb 500, such as within the stem of the bulb 500 or near a side of the body of the bulb 500. Other or additional components could also be included in the bulb 500, such as rectification circuitry for rectifying an AC input signal or heat dissipation structures for cooling internal components of the bulb 500.

Although FIG. 5 illustrates one example use of an isolated SEPIC power converter, various changes may be made to FIG. 5. For example, the bulb 500 could have any suitable form factor and is not limited to the shape shown in FIG. 5. As particular examples, the bulb 500 could have an R30, R38, R40, or A19 form factor.

Figure 6:
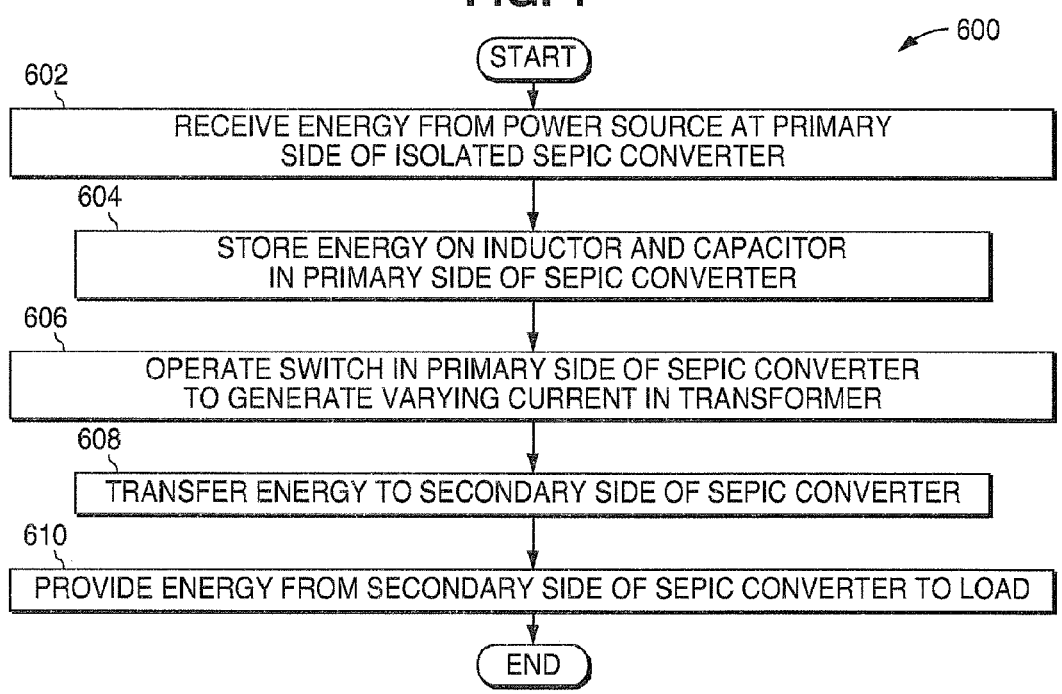
FIG. 6 illustrates an example method for power conversion using an isolated SEPIC power converter according to this disclosure.

FIG. 6 illustrates an example method 600 for power conversion using an isolated SEPIC power converter according to this disclosure. For ease of explanation, the method 600 is described with respect to the isolated SEPIC power converter 100 of FIG. 1. The same or similar method could be used with the isolated SEPIC power converter 300 of FIG. 3 or any other suitable isolated SEPIC power converter.

Energy is received from a power source at a primary side of an isolated SEPIC power converter at step 602. This could include, for example, the primary side 102 of the power converter 100 receiving energy from a battery or other power source 108.

Energy is stored on an inductor and a capacitor in the primary side of the isolated SEPIC power converter at step 604, and a switch is operated in the primary side of the isolated SEPIC power converter to generate a varying current in a transformer at step 606. This could include, for example, storing energy from the power source 108 on the inductor 110. This could also include operating the switch 114 to couple and uncouple the inductor 110 to and from system ground or system return. This causes energy to be stored on and removed from the capacitor 118 and creates a varying current in the primary coil of the transformer 106.

The varying current in the transformer transfers energy to a secondary side of the isolated SEPIC power converter at step 608. This could include, for example, transferring energy from the primary coil of the transformer 106 to at least one secondary coil in the transformer 106. If the diode 112 is present, the transferred energy could include energy stored on the capacitor 118 during "valleys" in a rectified input voltage from the power source 108. The energy is provided from the secondary side of the isolated SEPIC power converter to a load at step 610. The load 124 could represent any suitable load, such as one or more LEDs or other devices that operate using energy from the power source 108.

Although FIG. 6 illustrates one example of a method 600 for power conversion using an isolated SEPIC power converter, various changes may be made to FIG. 6. For example, while shown as a series of steps, various steps in FIG. 6 could overlap, occur in parallel, occur in a different order, or occur multiple times.

It may be advantageous to set forth definitions of certain words and phrases that have been used within this patent document. The term "couple" and its derivatives refer to any direct or indirect communication between components, whether or not those components are in physical contact with each other. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A single-ended primary-inductance converter (SEPIC) controller configured for operation as a SEPIC power converter with an LC network including a transformer with a primary side coil and a secondary side coil, the LC network further including a primary side inductor, a primary side capacitor, and a primary side current limiting component, the SEPIC power converter operable to convert power from an input power source into a regulated output power supplied to a load, the SEPIC controller comprising:
   a transistor switch configured to couple between a switch node and a system return;
   the transformer configurable with a first end of the primary side coil coupled to the switch node;
   the LC network configurable with
      the primary side inductor coupled between the input power source and the current limiting component;
      the primary side current limiting component coupled between the primary side inductor and the switch node, and configured to enable current flow in a forward direction from the inductor to the switch node, and to block current flow in a reverse direction;
      the primary side capacitor coupled between a second end of the primary side coil and the system return, and configured to transfer energy to the secondary side coil of the transformer during valleys associated with a rectified input voltage;
   a controller configured to control the transistor to selectively connect the switch node to the system return, and thereby control current through the primary side coil to supply the regulated output power from the secondary side coil.

2. The SEPIC controller of claim 1, wherein the primary side current limiting component comprises a diode coupled between the inductor and the switch node.

3. The SEPIC controller of claim 1, wherein:
   the SEPIC power converter is operable as a flyback converter when the switch is closed; and
   the SEPIC power converter is operable as a forward converter when the switch is opened.

4. The SEPIC controller of claim 1, wherein the SEPIC power converter has a power factor of at least about 0.9.

5. The SEPIC controller of claim 1, further comprising:
   an output node configured to couple to the load;
   a second current limiting component configured to couple between the secondary coil and the output node, and configured to enable current flow in a forward direction from the secondary coil to the output node; and
   a second capacitor configured to couple to the output node and across the load.

6. A single-ended primary-inductance converter (SEPIC) power converter configured to convert power from an input power source into a regulated output power supplied to a load, the SEPIC power converter comprising
   a transistor switch configured to couple between a switch node and a system return;

a transformer with a primary side coil and a secondary side coil, and with a first end of the primary side coil coupled to the switch node;

an LC network including:
   a primary side inductor coupled between the input power source and the current limiting component;
   a current limiting component coupled between the primary side inductor and the switch node, and configured to enable current flow in a forward direction from the inductor to the switch node, and to block current flow in a reverse direction;
   a primary side capacitor coupled between a second end of the primary side coil and the system return, and configured to transfer energy to the secondary side coil of the transformer during valleys associated with a rectified input voltage;

a controller configured to control the transistor to selectively connect the switch node to the system return, and thereby control current through the primary side coil to supply the regulated output power from the secondary side coil.

7. The SEPIC power converter of claim 6, wherein the primary side current limiting component comprises a diode coupled between the inductor and the switch node.

8. The SEPIC power converter of claim 6, wherein:
   the SEPIC power converter is operable as a flyback converter when the switch is closed; and
   the SEPIC power converter is operable as a forward converter when the switch is opened.

9. The SEPIC power converter of claim 6, wherein the SEPIC power converter has a power factor of at least about 0.9.

10. The SEPIC power converter of claim 6, further comprising:
   an output node configured to couple to the load;
   a second current limiting component configured to couple between the secondary coil and the output node, and configured to enable current flow in a forward direction from the secondary coil to the output node; and
   a second capacitor configured to couple to the output node and across the load.

11. The SEPIC power converter of claim 6, wherein the load comprises one or more light emitting diodes (LEDs).

12. The SEPIC power converter of claim 11, wherein the load comprises an LED light bulb having an equivalent light output of between about 40 W and about 200 W.

* * * * *